United States Patent
Yan (10) Patent No.: US 6,168,299 B1
(45) Date of Patent: Jan. 2, 2001

(54) ENERGY EFFICIENT RECESSED LIGHTING FIXTURE

(76) Inventor: Ellis Yan, 29 Annandale Dr., South Russell, OH (US) 44022

( * ) Notice: Under 35 U.S.C. 154(b), the term of this patent shall be extended for 0 days.

(21) Appl. No.: 09/302,332

(22) Filed: Apr. 30, 1999

(51) Int. Cl.$^7$ ........................................................ F21S 1/06
(52) U.S. Cl. .......................... 362/365; 362/226; 362/216; 362/260
(58) Field of Search .................................... 362/365, 226, 362/216, 260

(56) References Cited

U.S. PATENT DOCUMENTS

| | | | |
|---|---|---|---|
| 3,986,017 | * 10/1976 | Kulle | 240/41 R |
| 5,189,339 | * 2/1993 | Peshak | 315/58 |
| 5,320,547 | 6/1994 | Mews et al. | |
| 5,440,471 | * 8/1995 | Zadeh | 362/365 |
| 5,580,158 | * 12/1996 | Aubrey et al. | 362/226 |
| 5,653,527 | * 8/1997 | Muessli | 362/226 |
| 5,707,143 | 1/1998 | Hentz. | |

* cited by examiner

Primary Examiner—Alan Cariaso
Assistant Examiner—Ali Alavi
(74) Attorney, Agent, or Firm—Joseph H. Taddeo (57) ABSTRACT

A novel energy efficient recessed downlighted lighting fixture, using a compact laterally twisted, fluorescent lamp, and electronic ballast, provides an easy to install procedure for retrofit installations. Using an integrated socket-and-ballast subassembly, the overall height is reduced so that it can find use with existing metal housings. This recessed fixture uses a newly designed energy efficient compact fluorescent lamp as the primary lighting source. This fluorescent lamp, which is a laterally twisted tube commonly referred to as a "springlamp" allows the shortest lamp known to the fluorescent lamp industry. It provides for minimal light trapping, thereby creating the maximum concentrated lighting output, and lighting distribution that is closest to the illumination supplied by an incandescent bulb. The laterally twisted "SpringLamp" is centrally positioned at the focal point of the parabolically shaped portion of the reflector to produce a collimated-like downlighted column of concentrated light that enhances the illumination efficiency when measured at the central portion of the beam.

23 Claims, 10 Drawing Sheets

ENERGY EFFICIENT RECESSED LIGHTING FIXTURE

FIELD OF THE INVENTION

The present invention relates primarily to a novel energy efficient recessed lighting fixture, and more particularly, to a novel recessed downlighted lighting fixture using a compact spring type fluorescent lamp that is associated with an electronic ballast.

BACKGROUND OF THE INVENTION

In recent times, one of the more frequently used lighting fixtures is the recessed downlighted lighting fixture. These fixtures are found quite desirable when used in large expansive areas to attain a uniform pattern in lighting distribution. This type of fixture is also used for creating mood lighting for highlighting certain featured areas, such as fireplaces, floral arrangements and the like.

Previously, much of the prior art disclosed recessed lighting fixtures that used incandescent lamps as the illumination source. Incandescent lamps provide inefficient operation, where it is not only the increased operating cost, but also the increased installation cost. Additionally, these incandescent lamps are generally short lived, thereby adding to the increased maintenance costs.

A typical incandescent lamp such as a 100-watt light bulb provides an average of 1710 lumens of lighting illumination, which approximates 17 lumens per watt. Additionally, this light bulb has an average life expectancy of 750 hours of operation, which equates to about one month of continuous operation.

Presently, the prior art teaches of fluorescent lamp sources of illumination that are supported by a tubular form, made from laminating two molded glass assemblies together. Other prior art teaches of downlighted retrofit fixtures that use hardwired ballasts that are mounted directly to the splice box of an existing fixture. Still other prior art disclose the use of candelabra based fluorescent lamps and bulbs as the illumination source.

The following prior art discloses the various aspects in the design and use of downlighted fluorescent fixtures.

U.S. Pat. No. 3,899,712, granted Aug. 12, 1975, to H. L. Whitting, discloses a tapered helical compact fluorescent lamp, comprising a tapered cylindrical envelope having a helically shaped channel of non-uniform pitch, thereby providing a discharge path circumferentially around the envelope with a pair of electrodes disposed at each end of the discharge path. The interior surface is coated with a luminescent material and its interior chamber is filled with an ionizable gas.

U.S. Pat. No. 5,073,845, granted Dec. 17, 1991, to T. R. Aubrey, teaches a retrofit unit for replacing conventional incandescent light bulbs with fluorescent or similar light sources. A hard-wired ballast is used in conjunction with conventional light fixtures to permit retrofit conversion.

U.S. Pat. No. 5,320,547, granted Jun. 14, 1994, to H. P. Mews, et al., discloses a lamp socket for a fluorescent lamp that permits insertion and removal of a fluorescent lamp in and from a socket, the socket being formed within a body and having an engagement surface wall from which a shelf projects.

U.S. Pat. No. 5,707,143, granted Jan. 13, 1998, to J. A. Hentz, teaches of a pull-on clip that is manually assembled to a downlighting reflector trim in a snap-fitting manner. The pull-on clip facilitates positive lamp positioning, thereby providing a clean appearance.

The prior art recited above does not teach of the novel advantages that are found in the present invention.

Accordingly, it is therefore an object of the present invention to provide a novel downlighted recessed lighting fixture that uses a compact, laterally twisted tube, fluorescent SpringLamp as the source of illumination.

It is another object of the present invention to provide a novel downlighted recessed lighting fixture that is comprised of two sub-assemblies: a unitized reflector having a simplified one-step mounting procedure and an integrated lamp socket and ballast.

It is still another object of the present invention to provide a novel downlighted recessed lighting fixture that uses a simplified spring mounted assembly.

It is still yet another object of the present invention to provide a novel downlighted recessed lighting fixture having a reflector that has a circular wire member to retain two reflector support arms which captivate a pair of mounting springs, each held in place, pivoted, on a blind pan-head rivet.

It is a further object of the present invention to provide a novel downlighted recessed lighting fixture that utilizes an integrated socket and ballast.

It is still a further object of the present invention to provide a novel downlighted recessed lighting fixture whose total height of the integrated assembly is less than 7 inches.

It is still yet a further object of the present invention to provide a novel downlighted recessed lighting fixture that furnishes improved operating efficiency.

An additional object of the present invention is to provide a novel downlighted recessed lighting fixture that whose universal design can be used in either new work or in retrofitting installations.

Still, one additional object of the present invention is to provide a novel downlighted recessed lighting fixture that obviates the need for a thermal protective device within the housing because of the substantially reduced operating temperature.

A final object of the present invention is to provide a novel downlighted recessed lighting fixture that has a simplified assembly thereby reducing the manufacturing costs.

These, as well as other objects and advantages of the present invention will be better understood and appreciated upon reading the following detailed description of the preferred embodiment and it's alternative embodiments when taken in conjunction with the accompanying drawings.

SUMMARY OF THE INVENTION

The present invention relates to a novel energy efficient recessed downlighted lighting fixture. This downlighted fixture is suitably designed for use in retrofitted installations, as well as in new work applications.

This novel recessed fixture is comprised of two basic subassemblies; a highly polished aluminum reflector, having novel spring type retention and a unique socket-and-ballast assembly. The height of the entire recessed lighting fixture is less than 7 inches when fully assembled.

This recessed fixture uses a newly designed energy efficient compact fluorescent lamp as the primary lighting source. This fluorescent lamp, a laterally twisted tube, more commonly referred to as a "SpringLamp" allows the shortest lamp known to the fluorescent lamp industry to be used. It provides for minimal light trapping, thereby creating the maximum concentrated lighting output, and lighting distribution that is closest to the illumination supplied by an incandescent bulb.

Typically, a 26 watt SpringLamp provides 1750 lumens of light output, which is 67.3 lumens per watt. This lamp provides a lighting output that slightly exceeds that of a standard conventional incandescent lamp—1750 lumens of the SpringLamp compared to 1710 lumens for an incandescent lamp, a 2.3 percent rated increase in lighting output.

The rated lamp life of the SpringLamp is 10,000 hours compared to the 750 hours of a standard incandescent bulb—a 13.3 fold improvement in the lamp longevity.

BRIEF DESCRIPTION OF THE DRAWINGS

The present invention is pictorially illustrated in the accompanying drawings that are attached herein.

DETAILED DESCRIPTION OF THE INVENTION

The present invention relates primarily to a novel downlighted recessed lighting fixture that can be used either in new installations or in retrofitting existing fixtures.

When used in existing installations, this novel downlighted recessed fixture can not only provide an increased operating efficiency, which results in decreased operating costs, but also can provide decreased maintenance expense because of the improvement in the rated useful life of the lamp. In a typical existing lighting installation, where the lighting run is protected with a 15 ampere fuse or circuit breaker, there can be installed up to ten lighting fixtures, (rated at 1.5 amperes per lighting outlet), and when using 100 watt incandescent bulbs, a total of 1000 watts is consumed. After retrofitting, using the 26-watt SpringLamp, for the more than equivalent illumination, only 260 watts of energy are consumed, giving energy savings of 740 watts, for an efficiency of 74 percent.

In new installations, there is still the further potential for further savings. Because the fixture is designed for use with the SpringLamp, interchangeability with a candelabra based incandescent bulb is not directly possible. This leads to the obvious conclusion that up to 38 twenty-six watt fluorescent lamps could be used, the National Electric Code permitting, in a single lighting run that uses #14 wire. This fact could result in having to use fewer expensive circuit breakers and less wire needed for parallel runs. Further, because of the reduced safe operating temperature, the need for thermal protection is obviated thereby giving added savings.

Figure 1:
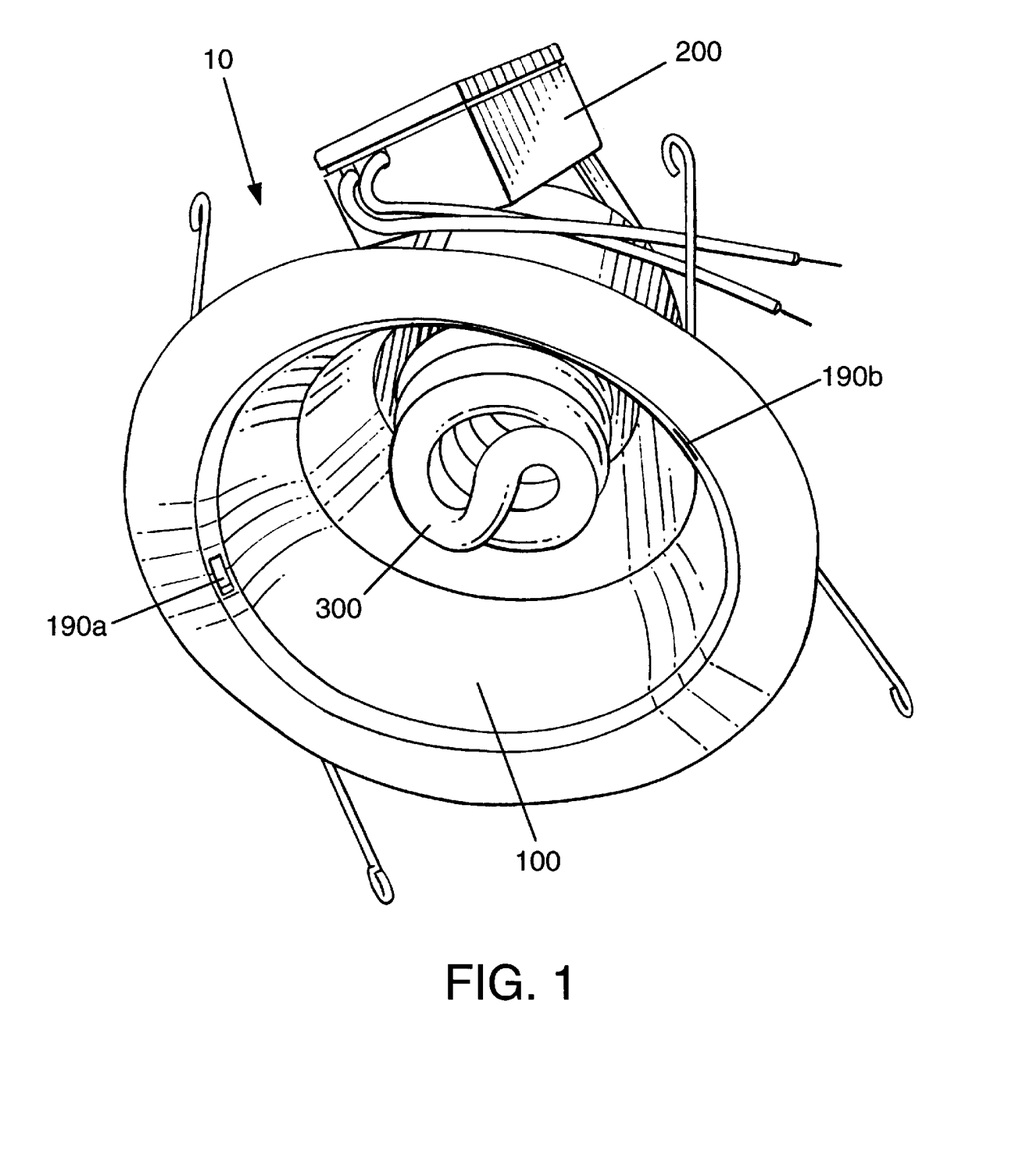
FIG. 1 is a perspective view of the preferred embodiment of the recessed fluorescent lighting fixture.

Referring now to FIG. 1, there is shown a perspective view of the newly designed recessed lighting fixture 10. This novel recessed fixture is comprised of two basic subassemblies: a highly polished aluminum reflector assembly 100 and a unique socket-and-ballast assembly 200. The height of the entire recessed lighting fixture is less than 7 inches when fully assembled, with the ballast 200 being mounted inline with the central axis of the fixture.

The largest wattage laterally twisted SpringLamp is 26 watts and when mounted into the fixture is recessed into the fixture by approximately one half inch. One advantage of using a laterally twisted fluorescent lamp is that it is the shortest lamp known to the fluorescent lamp industry. It provides for minimal light trapping, thereby creating the maximum concentrated light output, and lighting distribution that is closest to the illumination supplied by an incandescent bulb.

The laterally twisted "SpringLamp" is centrally positioned at the focal point of the parabolically shaped portion of the reflector. The light is reflected in parallel rays downward from the reflector surface. As such, there is produced a collimated-like downlighted columnar beam of concentrated light that enhances the illumination efficiency when measured at the central portion of the beam.

Figure 2:
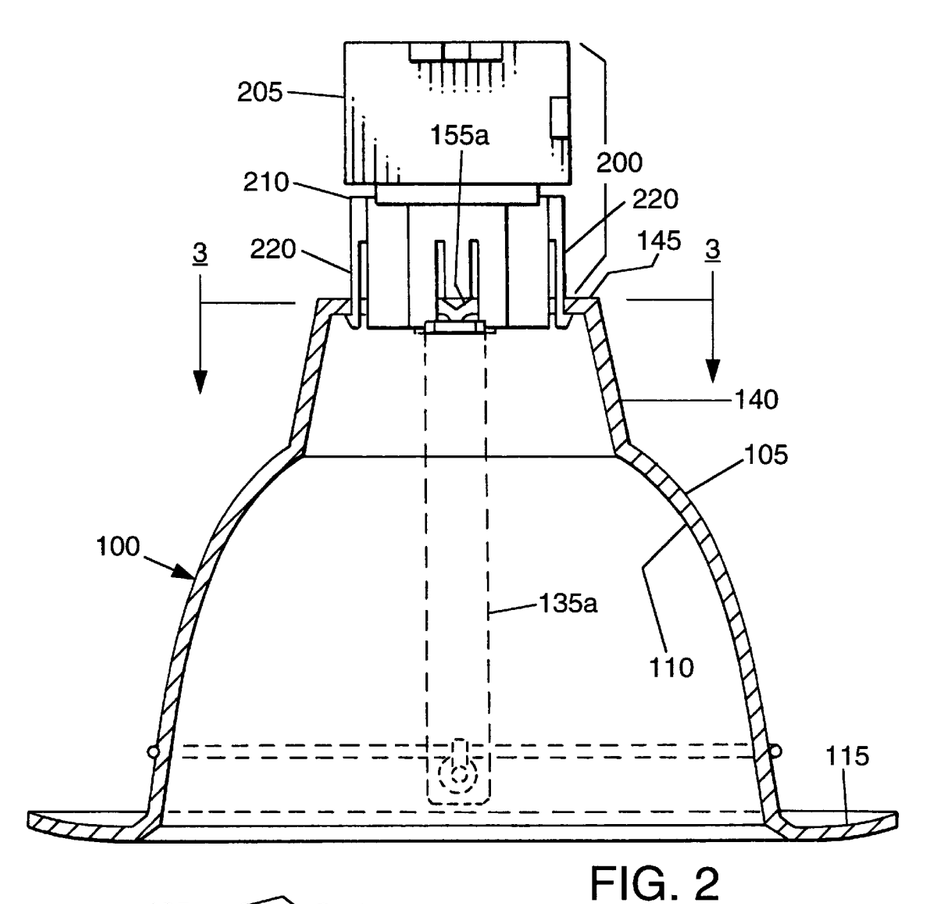
FIG. 2 is a side sectional view of the preferred embodiment of the recessed fluorescent lighting fixture.

FIG. 2, which is a sectional view of the recessed fluorescent lighting fixture 10, illustrates the major sub-assemblies comprising the fixture. They are the socket-and ballast assembly 200 and the reflector 100. The socket-and-ballast assembly is comprised of an electronic ballast 205 to which is attached the fluorescent lamp socket 210. Locking tabs 220 secure the socket-and ballast assembly 200 to the reflector assembly 100, as further shown in the sectional drawing of FIG. 3, which is taken along line 3—3 of FIG. 2.

The reflector assembly 100 is comprised of a top cylindrical portion 140, the parabolically shaped reflector body 105, and flanged skirt 115. The interior reflective surface 110 is a highly polished, parabolically shaped, aluminum surface to reflect the light emanating from the bulb in a downward columnar-like manner. The flanged skirt 115 provides a decorative painted surface that is compatible in color with most off-white ceiling treatments.

Figure 3:
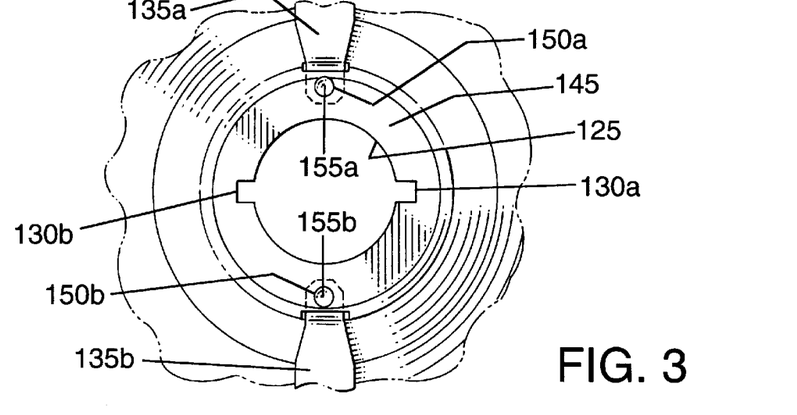
FIG. 3 is a detailed side sectional plan view taken along line 3—3 of FIG. 2 of the recessed fluorescent lighting fixture.

With reference to FIG. 3, there is shown a fragmentary sectional view illustrating the circular opening 125 for mounting the socket-and-ballast 200. Notched slots 130A and 130B, found on opposite sides of the circular opening 125, provide for the engagement of locking tabs 220, as shown in FIGS. 3 through 10, that mount the socket-and-ballast assembly 200.

Figure 4:
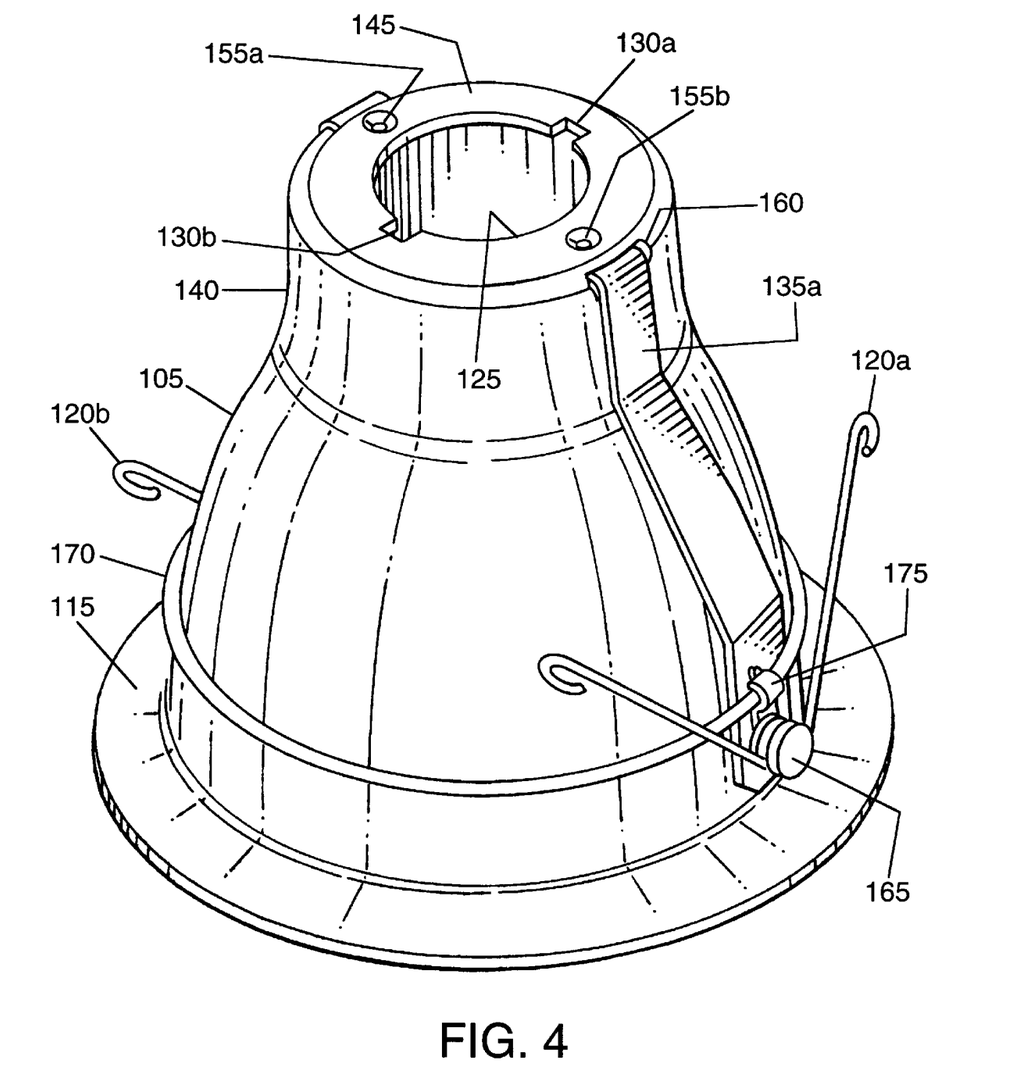
FIG. 4 is a perspective view of the reflector assembly of the recessed fluorescent lighting fixture detailing the installation spring retention.

Turning now to FIGS. 3 and 4, there are two spring support arms, 135A and 135B, where each has one-eighth inch diameter holes, 150A and 150B, located at the upper end of each arm, to engage with two conically shaped indentions, 155A and 155B, positioned oppositely disposed about the circular opening 125, in the top flat surface 145 of the cylindrical portion 140 of the reflector 100 to provide an interlocking engagement.

Each spring support arm, 135A and 135B, is inserted through a rectangular slot 160, located in the sidewall 140 of the upper cylindrical portion of reflector 100. A pan head rivet 165 is riveted at the lower end of spring support arm 135 that acts as a pivot for the mounting springs 120A and 120B. The spring support arms are then held in place with the circular wire member 170 that is securely held in place with support clamps 175.

Figure 5:
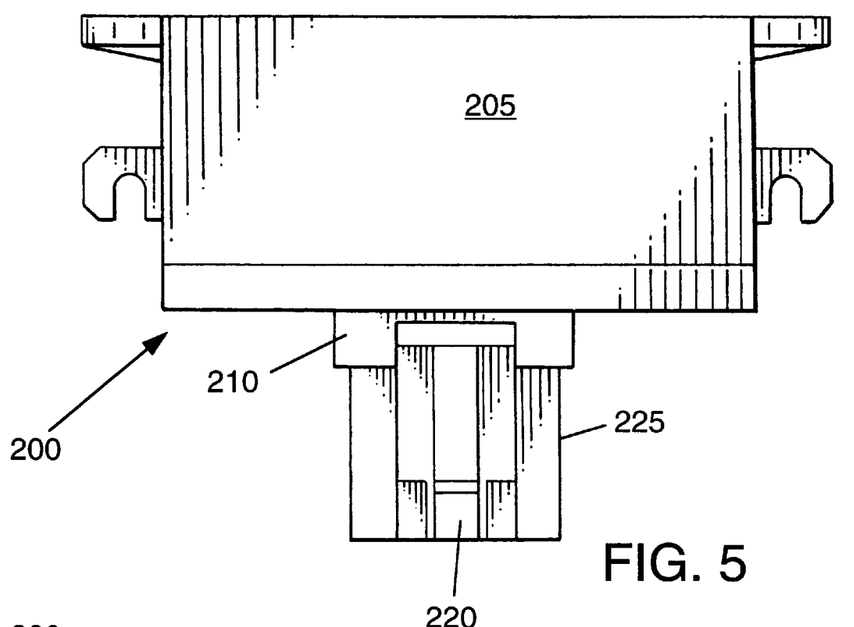
FIG. 5 is a side elevational view of the socket-and-ballast assembly.
Figure 6:
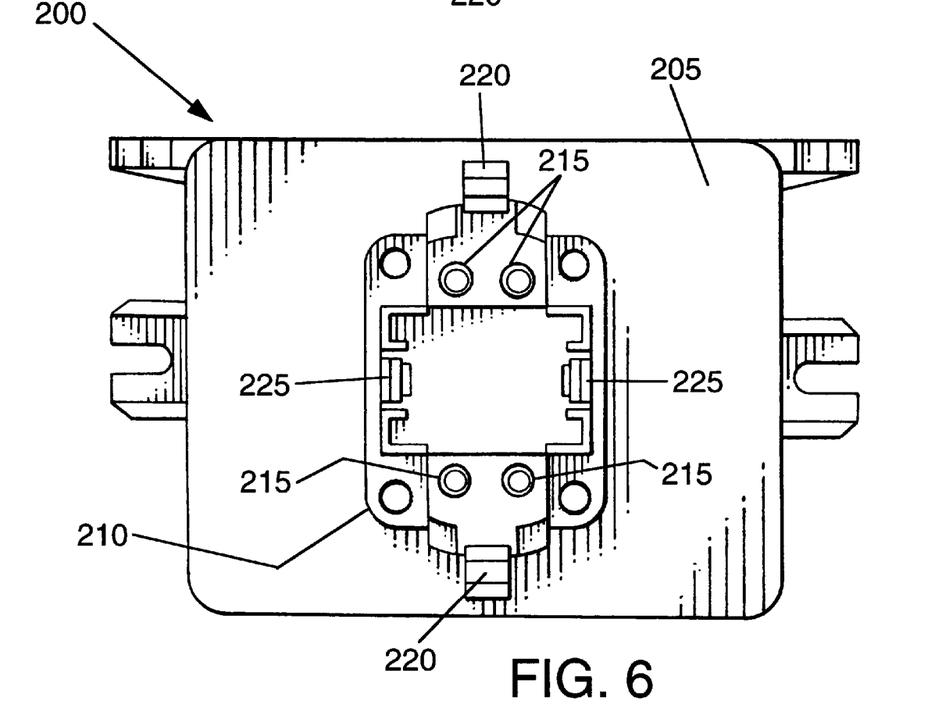
FIG. 6 is a bottom elevational view of the socket-and-ballast assembly.
Figures 7, 8:
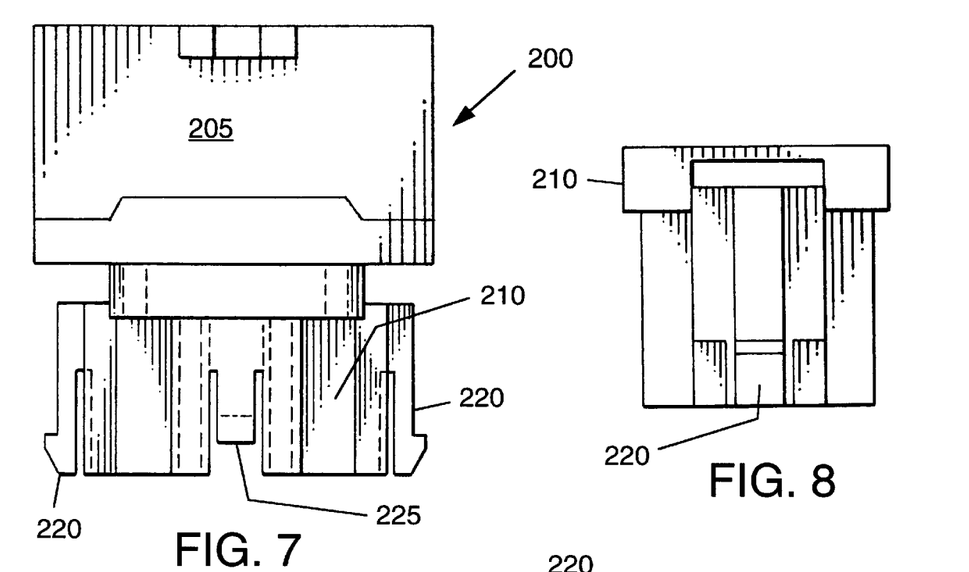
FIG. 7 is a front elevational view of the socket-and-ballast assembly.
FIG. 8 is a side elevational view of the fluorescent lamp socket.
Figure 9:
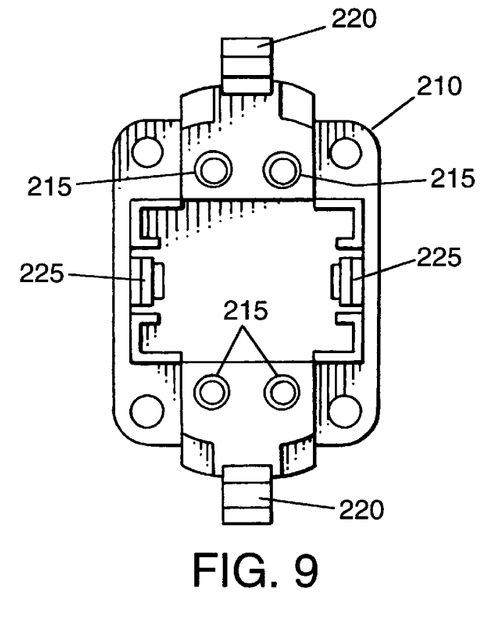
FIG. 9 is a bottom elevational view of the fluorescent lamp socket.
Figure 10:
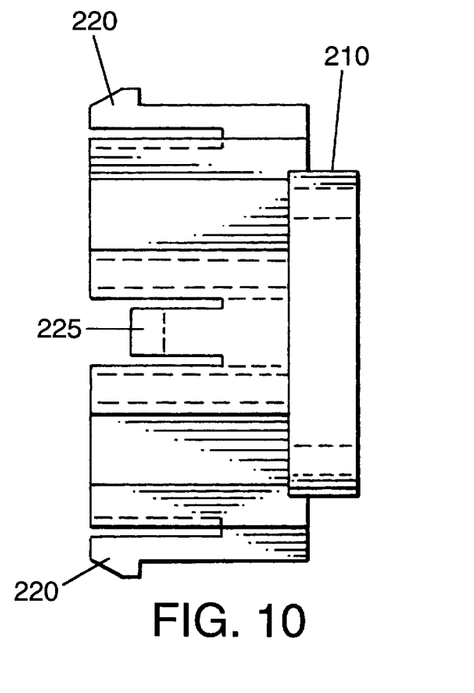
FIG. 10 is a front elevational view of the fluorescent lamp socket.

FIGS. 5, 6, and 7 detail the socket-and-ballast assembly 200, where FIGS. 8, 9, and 10, detail the fluorescent lamp socket 210. The socket-and-ballast assembly 200 is comprised of electronic ballast 205 and a fluorescent lamp socket 210. The electronic ballast is of the type having a modified, rapid-start sequence. Securely attached to the electronic ballast 205, by means of epoxy cement, is the fluorescent lamp socket 210. The fluorescent lamp socket housing is made preferably of nylon, or of any other suitable plastic material that can be injection molded. Locking tabs 220 secure the socket-and-ballast assembly 200 when inserted into the reflector assembly 100. Lamp base retaining tabs 225 provide for the low-friction, ease of insertion or removal of the SpringLamp, but yet provide a securely fitted means of retention to preclude the lamp from inadvertently falling out from the socket. Four pin receptacles 215, made of a beryllium copper material provide for the reliable electrical contact of the SpringLamp fluorescent lamp when inserted into the lamp socket 210.

Figure 11:
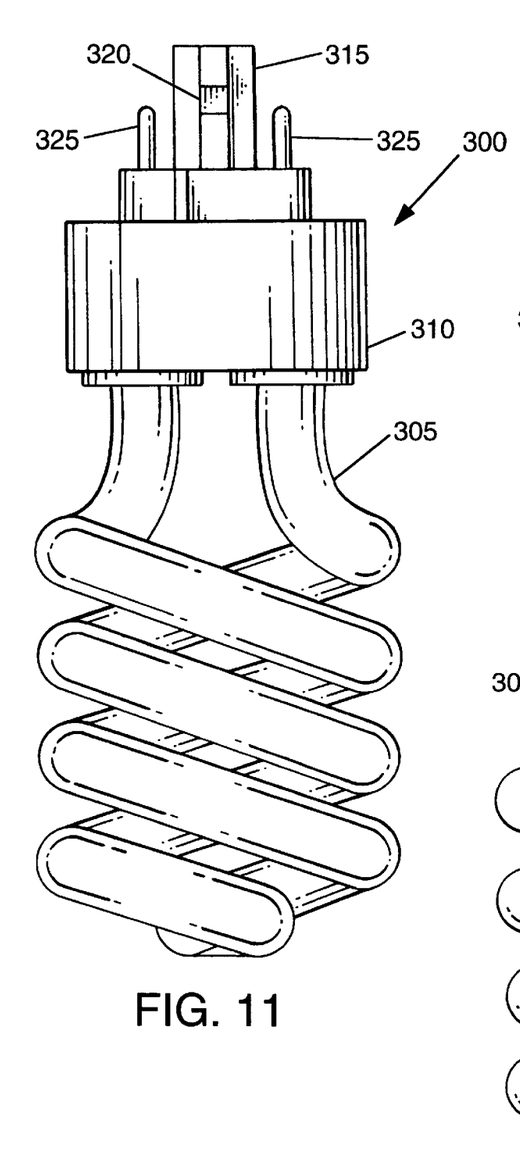
FIG. 11 is a side elevational view of the laterally twisted tube fluorescent lamp.
Figure 12:
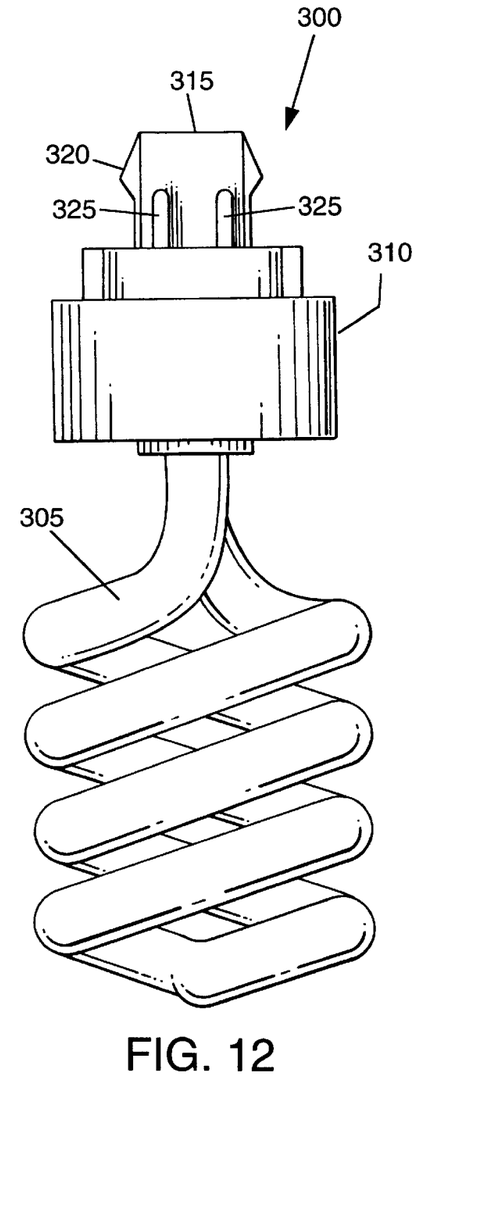
FIG. 12 is an orthogonal side elevational view of the laterally twisted tube fluorescent lamp.

Turning now to FIGS. 11 and 12, there is depicted a typical SpringLamp that is a laterally twisted type fluorescent lamp. The lamp is available in several wattage ranges: the largest being 26 watts, providing 1750 lumens; a 23 watt, providing 1500 lumens; an 18 watt, providing 1200 lumens; a 15 watt, providing 980; and the smallest being 11 watts, providing 680 lumens.

The laterally twisted fluorescent lamp 300 is comprised of a plurality of laterally twisted intertwined lamp tubing 305 that in mounted to the lamp base 310. The lamp tubing is preferably made from glass tubing; having an outside diameter of 1.2 centimeters and having an interior uniformly coated with a luminescent material. Oppositely disposed at each end of the lamp tubing are two coated tungsten lamp filaments 330 and 335, (in FIG. 14). The gaseous discharge path 340 is interior the glass tubing 305, traversing from coated tungsten filament 330 to coated tungsten filament 335. The filaments are coated with a suitable activating material to initiate and gaseous discharge within the twisted glass tubing.

Figure 13:
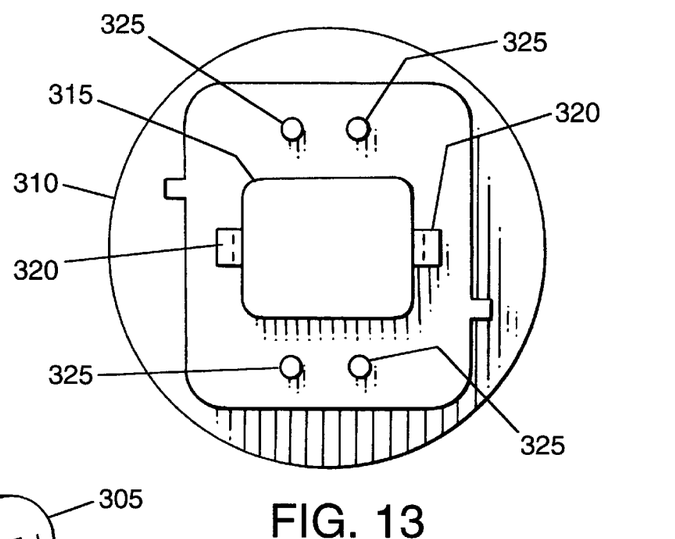
FIG. 13 is the top view of a typical base, pin, and keyed insertion arrangement for the laterally twisted fluorescent lamp.

The lamp base 310, best shown in FIGS. 11, 12, and 13, is constructed preferably in one-piece, by an injection molding process, using a plastic material, such as polypropylene, or any other suitable material. Projecting from the base 310, is a rectangular shaped boss 315 that provides a keyed insertion into its mating socket 210, as shown in the previous drawings. On either side of the rectangular boss 315 are two locking protrusions 320 that engage with the lamp base, retaining tabs 225, in lamp socket 210.

Figure 14:
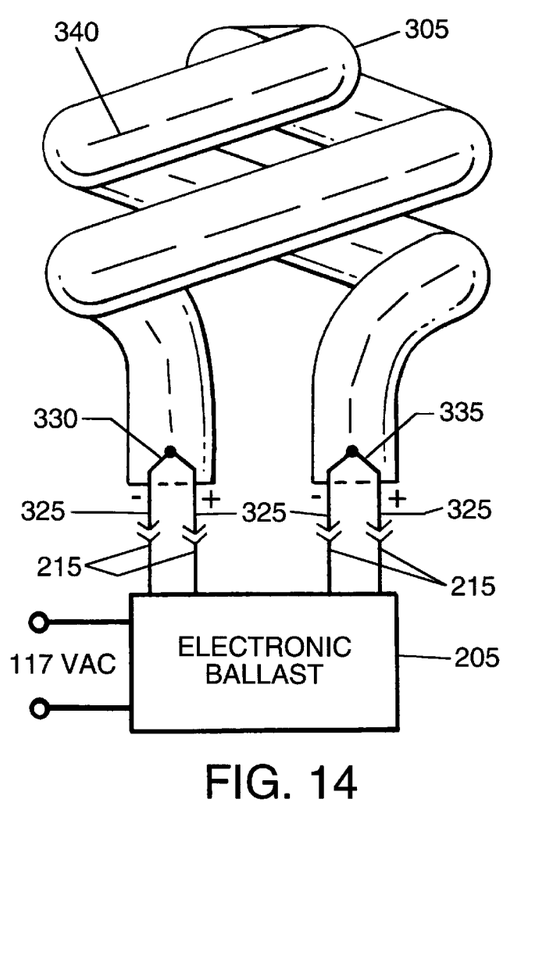
FIG. 14 is a schematic representation of electrical wiring arrangement for recessed fluorescent lamp lighting fixture.

As shown in FIG. 14, there is a schematic representation depicting the electrical connections between the fluorescent lamp 300, the electronic ballast 200, via the pins 325 and the pin receptacles 215, to energize lamp filaments 330 and 335.

Figure 15:
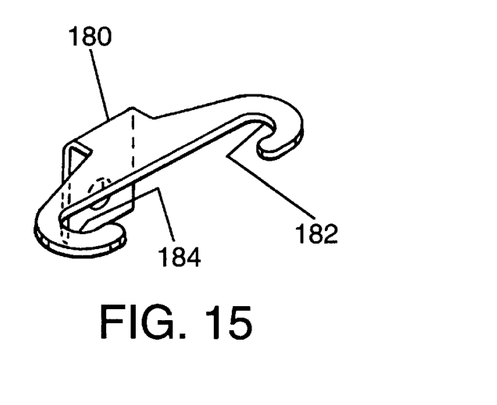
FIG. 15 is a perspective view of the "C" shaped, spring retention bracket, located within the metal, recessed lamp housing.
Figure 16:
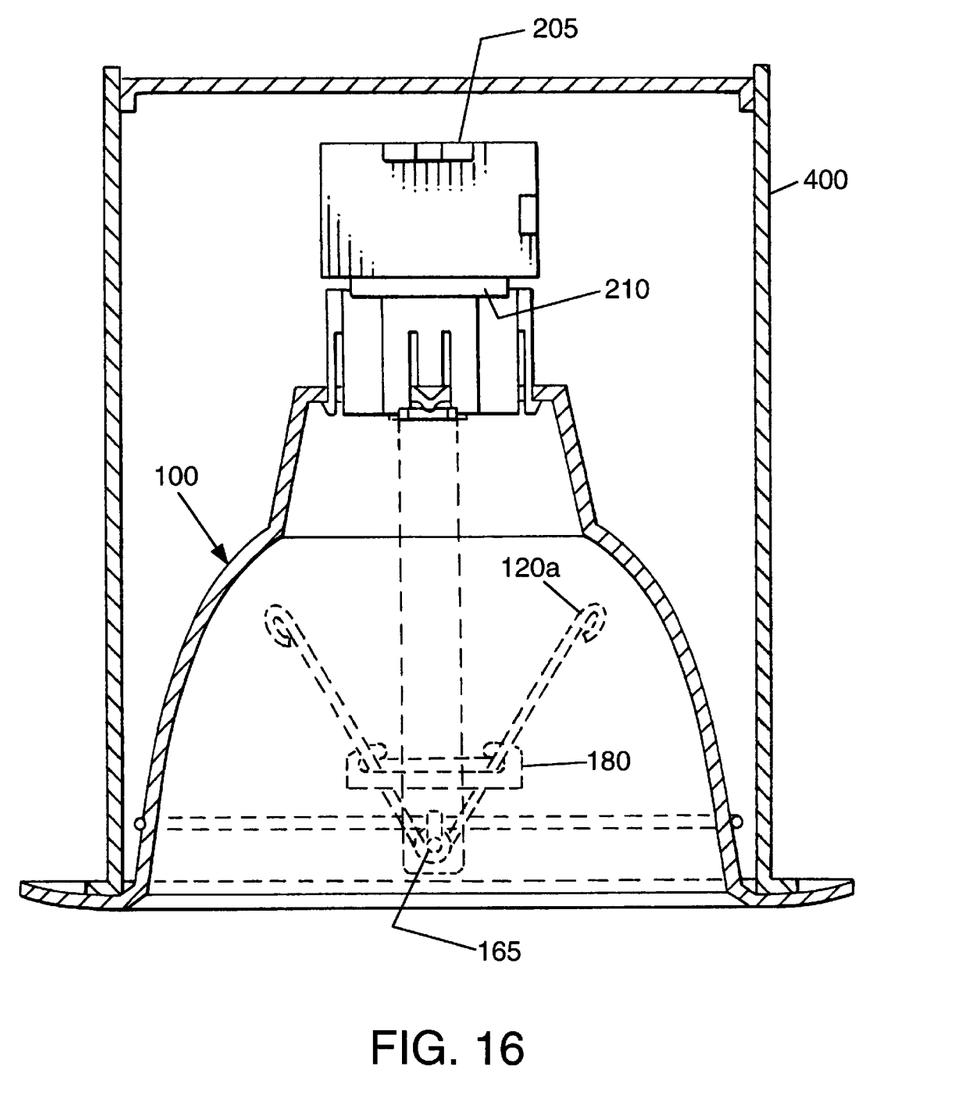
FIG. 16 side sectional view of the preferred embodiment that best illustrates the spring retention of the recessed fluorescent lighting fixture within a recessed metal housing.

The spring retention assembly is best shown in FIGS. 15 and 16. A typical spring retention bracket 180 is pictorially shown in FIG. 15. It is a "C" shaped metal bracket, having two notched indentations, 182 and 184, at opposite ends to receive the wire mounting and retaining springs, 120A and 120B.

The wire springs 120A and 120B are shaped, when relaxed, so that the arms form an angle of approximately 120 degrees. The central region of the spring is formed in about one and two-thirds turn about the pivot 165. Each end is looped over, so that there are no sharp protruding ends that may injure the installer or repairman.

The one-step installation procedure, after connecting the wires from the fixture to the source of AC power, is to compress both ends of the spring together and insert the spring ends into the "C" shaped bracket, located in the fixture housing 400—then relax the spring ends. After both springs are installed, the fixture is pushed upwardly into the housing cavity.

Figure 17:
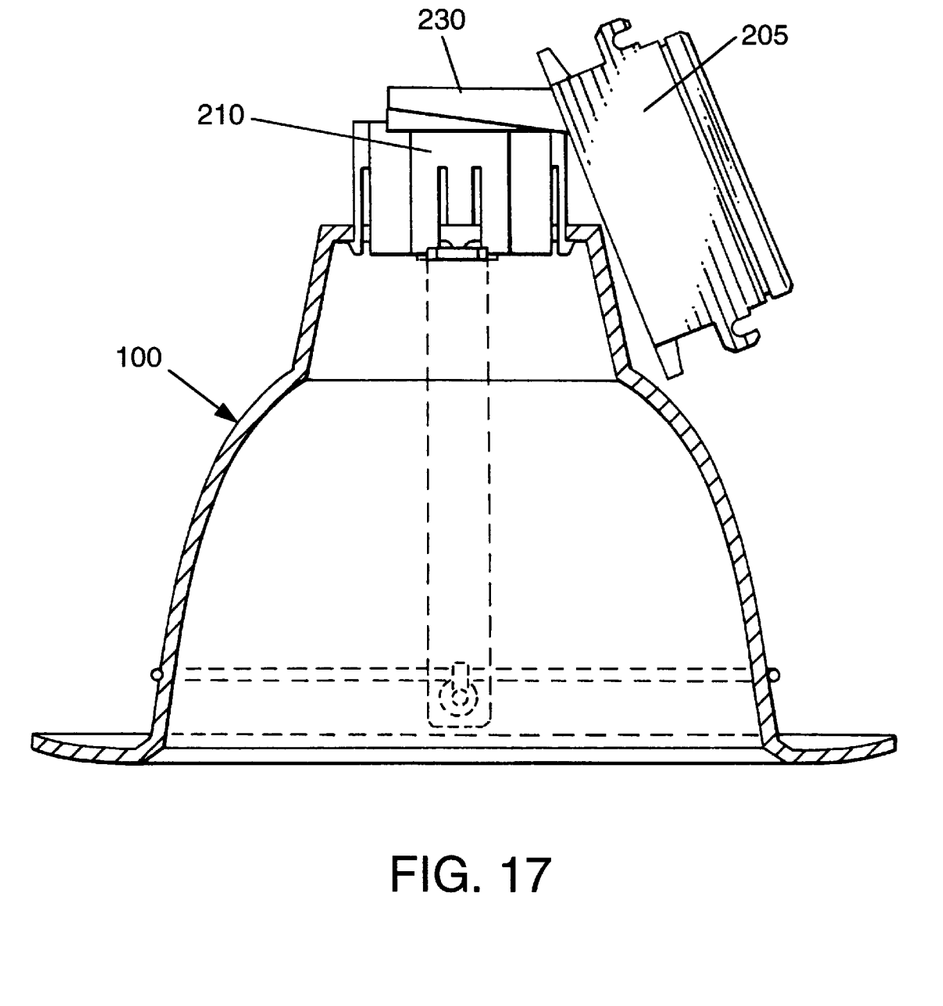
FIG. 17 is a side sectional view of an alternative embodiment of the recessed fluorescent lighting fixture, that shows a cantilever mounting for the electronic ballast to further reduce the overall height of the recessed lighting fixture.

As an alternative embodiment of the recessed fluorescent lighting fixture, as depicted in FIG. 17, there is shown a cantilever mounting for the electronic ballast to further reduce the overall height of the recessed lighting fixture. The lamp socket 210 is mounted to plastic mounting bracket 230, which in turn, is mounted to the electronic ballast 205.

Figure 1A:
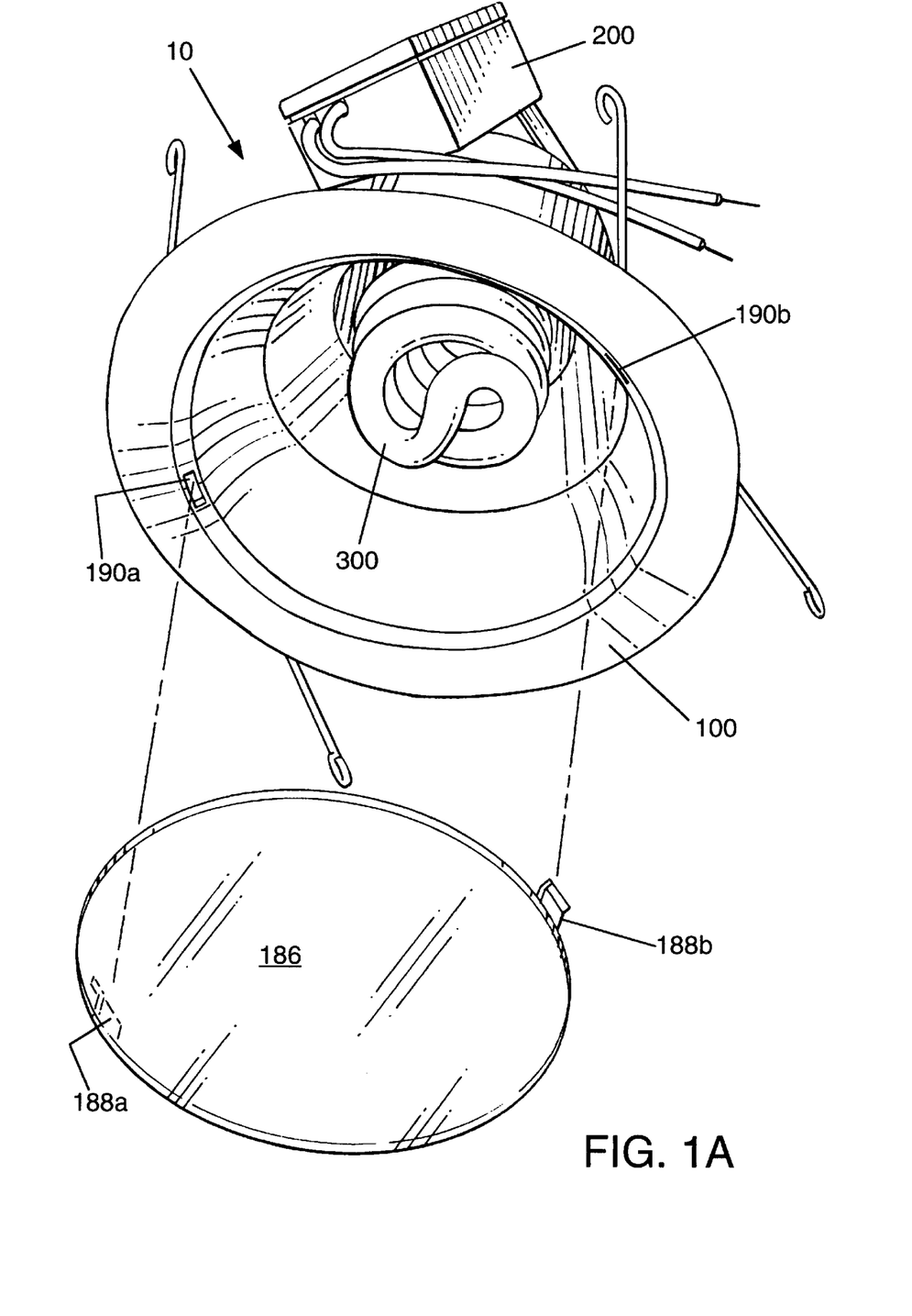
FIG 1A is a perspective view of a thin, translucent reflector cover having projecting feet for attachment to the reflector.

A thin, transparent reflector cover 186 may be installed on the second reflector opening, forward of the springlamp, by insertion of projecting feet 188a and 188b into corresponding reflector crevices 190a and 190b.

It should be appreciated and understood that the preceding detailed description is for example only. Other modifications, deviations, and improvements may be made without departing from the true spirit of the present invention.

I claim:

1. A recessed lighting fixture for use in an overhead downlight housing, comprising, a socket-and-ballast sub-assembly wherein an electronic ballast is fixed to a fluorescent lamp socket comprising an integrated lamp socket and ballast;

a reflector sub-assembly including a reflector associated with the socket-and-ballast sub-assembly and having a parabolic section with a central axis, a focal point and a flat top defining a circular opening with slots for mounting the socket-and-ballast subassembly;

means for attaching the reflector to the socket-and-ballast sub-assembly comprising said socket having a housing that includes locking tabs for insertion in said slots of the reflector opening, for detachable attachment of the socket-and-ballast subassembly to the reflector by a one-step procedure; and, a fluorescent light source insertable in the socket within the reflector.

2. The recessed lighting fixture of claim 1, wherein the light source comprises a compact, laterally twisted fluorescent springlamp that is encircled by said parabolic section to maximize light reflection and prevent lateral light diffusion.

3. The recessed lighting fixture of claim 2, wherein the springlamp is positioned on the central axis at the focal point of said parabolic section and includes a beam column of concentrated light reflected downward in parallel rays from said parabolic section with parallel beam lines for an enhanced illumination efficiency measured at a central portion of the beam.

4. The recessed lighting fixture of claim 3, the reflector further comprising a cylindrical portion that extends downward from the top, the parabolic section extending further downward from the cylindrical portion, and a flanged skirt radiating outward from the parabolic section.

5. The recessed lighting fixture of claim 4, the ballast including a modified, rapid start sequence.

6. The recessed lighting fixture of claim 5, further comprising a means for retaining the springlamp in the socket.

7. The recessed lighting fixture of claim 6, wherein the means for retaining comprises a socket lamp base that includes retaining tabs and the springlamp having locking protrusions that engage said retaining tabs to provide a low-friction, secure and reliable retention of the lamp in the socket.

8. The recessed lighting fixture of claim 7, the springlamp comprising laterally twisted and intertwined tubing with two ends mounted to a lamp base having a projecting boss and plurality of pins; and, each tubing end containing a filament coated with an activating material to initiate a gaseous discharge in the tubing.

9. The recessed lighting fixture of claim 8, the socket further comprising a plurality of pin receptacles for receiving each of the pins.

10. The recessed lighting fixture of claim 9, further comprising a means for mounting the fixture in a housing.

11. The recessed lighting fixture of claim 10, the means for mounting comprising a spring mounting assembly associated with the reflector and a mounting bracket associated with the housing.

12. The recessed lighting fixture of claim 11, the spring mounting assembly comprising two reflector support arms, each fixed to the reflector top, oppositely disposed about the circular opening, and retained on a circular wire member fixed on the reflector by a support clamp; and,
wherein the support arms captivate a pair of reflector mounting springs, each having a pair of spring arms with looped ends and pivotally mounted on a blind pan-head rivet.

13. The recessed lighting fixture according to claim 12, a pair "C" shaped brackets positioned on opposite sides of the housing, each bracket of the pair having two notches to receive the retaining springs and secure the fixture in an upward position in the housing.

14. The recessed lighting fixture according to claim 13, wherein the ballast-and-socket assembly is mounted on the central axis.

15. The recessed lighting fixture according to claim 13, wherein the socket is on the central axis and the ballast is connected to the socket in a cantilever position to further reduce overall height of the recessed lighting fixture.

16. The recessed lighting fixture of claim 13, said fixture further comprising a universal design that is suitable for either new construction or in retrofitting installations.

17. The recessed lighting fixture of claim 16, further comprising a lower power input than conventional downlighting assemblies, for an improved operating efficiency.

18. The recessed lighting fixture of claim 17, further comprising a diminished thermal output that obviates the need for a thermal protective device within the housing due to the substantially reduced operating temperature.

19. The recessed lighting fixture of claim 18, wherein the fixture has a total height and, wherein said height of an integrated assembly is less than 7 inches.

20. A lighting installation for use with a compact fluorescent springlamp and a standard housing having a pair of clamps extending inward on a housing cavity, comprising:
an electronic ballast fixed to a fluorescent light socket having receptacles and locking tabs, the socket detachably attached to a reflector having a parabolic body with a focal point, a first opening with notched slots and a second opening, and a pair of spring biased arms pivotally fixed on opposite sides of a reflector surface, said installation formed by the steps of snap locking the socket in the reflector first opening with placement of the locking tabs in the notched slots, inserting a compact laterally twisted fluorescent springlamp having two tubular ends mated to a lamp base with retaining tabs and pins through the second opening and into the socket to mate the retaining tabs with said locking tabs, insert said pins in respective receptacles, and position the springlamp at the focal point, inserting each pair of spring arms into each of the housing clamps and pushing the reflector upward into the housing cavity, whereby energizing the springlamp produces a columnar light beam of maximum intensity per energy unit consumed.

21. The light installation of claim 20, further comprising a thin, translucent reflector cover insertable on the reflector forward of the springlamp to maintain a clean reflector condition.

22. A method for using a recessed lighting fixture to maximize light output, comprising the steps of:
providing a socket and ballast assembly comprising an electronic ballast fixed to a fluorescent lamp socket having locking tabs;
suspending a compact fluorescent springlamp at a focal point of a parabolic reflector having a flat top defining a circular opening with slots for mounting the socket and ballast assembly; the springlamp communicating with the ballast through a fluorescent plug;
snap locking the socket and ballast assembly to the reflector with said locking tabs inserted into the slots for detachable attachment of the socket-and-ballast assembly to the reflector by a one-step procedure; and,
energizing the springlamp for a concentrated light output, and an efficient, lowered temperature, long-lasting lamp operation.

23. The method according to claim 22, wherein the springlamp has a lamp longevity with a rated lamp life of 10,000 hours.

* * * * *